UNITED STATES PATENT OFFICE.

GEORG WILHELM MEISER, OF LUDWIGSHAFEN-ON-THE-RHINE, GERMANY, ASSIGNOR TO THE BADISCHE ANILIN UND SODA FABRIK, OF LUDWIGSHAFEN-ON-THE-RHINE, GERMANY, A CORPORATION OF GERMANY.

AROMATIC DERIVATIVE OF AMIDO COMPOUNDS OF THE FATTY SERIES AND PROCESS OF PRODUCING SAME.

SPECIFICATION forming part of Letters Patent No. 715,680, dated December 9, 1902.

Application filed August 26, 1902. Serial No. 121,146. (No specimens.)

*To all whom it may concern:*

Be it known that I, GEORG WILHELM MEISER, doctor of philosophy and chemist, a subject of the King of Bavaria, residing at Ludwigshafen-on-the-Rhine, in the Kingdom of Bavaria, Germany, have invented new and useful Improvements in Aromatic Derivatives of Amido Compounds of the Fatty Series and Processes of Producing Same, of which the following is a specification.

I have discovered a new process of producing aromatic derivatives of certain amido compounds of the fatty series.

According to this invention I treat such fatty amido bodies, as I hereinafter term "alpha-amino-nitriles," with an aromatic amido body, thereby effecting what may be regarded as a substitution of a hydrogen atom of the amido group of the fatty amino-nitrile by an aromatic residue, or by an aromatic residue and an alkyl residue, according to the nature of the aromatic amin employed. At the same time ammonia is split off.

As "alpha-amino-nitriles" I designate amido bodies of the fatty series which contain a cyanogen (—CN) group and an amido group attached to the same fatty carbon atom, and as instances of such I mention amino-aceto-nitrile, $NH_2.CH_2.CN$; alpha-amino-propionitrile, $CH_3.CH{<}^{NH_2}_{CN}$; alpha - amino - phenyl-aceto-nitrile, 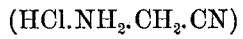; but of course I do not confine myself to the use of these bodies.

The aromatic amido bodies suitable for the purposes of this invention are more especially those of the benzene series, which are either primary amins or alkyl-substituted secondary amins—for instance, anilin, para-toluidin, mono-ethyl-anilin, $(C_6H_5.NH.C_2H_5,)$ anthranilic acid, and the like.

The bodies may be caused to react on one another in the free state, or one of them may be in the condition of a salt. In the latter case an ammonium salt is one of the products of the reaction, which may conveniently be caused to take place in the presence of alcohol or water.

The following examples will serve to exemplify my new process; but my invention is not confined to these examples. The parts are by weight.

Example 1: Dissolve one (1) part of amino-aceto-nitrile-hydrochlorid $$(HCl.NH_2.CH_2.CN)$$

in about two (2) parts of water. Then add about one (1) part of anilin and about one (1) part of alcohol, so that a clear solution results. Heat the mixture for several hours at a temperature of about one hundred degrees centigrade, (100° C.,) distil off the alcohol, and wash with dilute hydrochloric acid the oil which separates out, so as to free it from unchanged anilin. On being cooled and standing for some time it solidifies and is anilido-aceto-nitrile, $(C_6H_5.NH.CH_2.CN.)$ Example 2: Dissolve fifty-six (56) parts of amino-aceto-nitrile in about five hundred (500) parts of water. Add ninety-three (93) parts of anilin to the mixture and heat it, while stirring, for several hours at a temperature of about one hundred degrees centigrade, (100° C.) Ammonia is evolved and anilido-aceto-nitrile is formed, which latter can be purified by washing with dilute hydrochloric acid.

Example 3: Mix together one hundred and eighty-five (185) parts of amino-aceto-nitrile-hydrochlorid, four hundred (400) parts of water, two hundred and fourteen (214) parts of para-toluidin, and four hundred (400) parts of ethyl alcohol. Proceed as in Example 1. Para-toluido-aceto-nitrile

is formed.

Example 4: Instead of the para-toluidin of Example 3 take two hundred and forty-two (242) parts of mono-ethyl-anilin and take six hundred (600) parts of alcohol instead of four hundred parts. Proceed further as described in Example 3. A hitherto unknown body, which is regarded as ethyl-anilido-aceto-nitrile, $\left(\begin{array}{c}C_2H_5\\C_6H_5\end{array}\!\!\!>\!\!N.CH_2.CN.,\right)$ is obtained as a brown oil which can be distilled *in vacuo* at a temperature of about one hundred and eighty-three degrees centigrade, (183°C.) The distillate then solidifies to colorless crystals. By treatment with concentrated sulfuric acid the said body can be transformed into a new amide, which is regarded as possessing the constitution $\begin{array}{c}C_2H_5\\C_6H_5\end{array}\!\!\!>\!\!N.CH_2.CO.NH_2$, which when pure can be obtained in crystals melting at about one hundred and fourteen degrees centigrade, (114° C.)

Example 5: Heat together for about twelve (12) hours at a temperature of about one hundred degrees centigrade (100° C.) seventy (70) parts of amino-propionitrile,

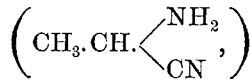

two hundred and seventy (270) parts of water, one hundred and twenty-nine and one-half (129½) parts of anilin-hydrochlorid, and twenty (20) parts of anilin. Then cool the mixture, slightly acidify it with hydrochloric acid, and wash the precipitate with water. The body so obtained, which can be purified by recrystallization from ligroin, is regarded as alpha-anilido-propionitrile

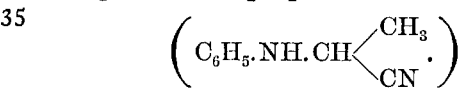

Example 6: Boil for from three to four (3 to 4) hours in a reflux apparatus an ethyl-alcoholic solution of one hundred and sixty-eight (168) parts of alpha-amino-phenyl-aceto-nitrile-hydrochlorid $\left(C_6H_5.CH\!\!<\!\!\begin{array}{c}NH_2\\CN\end{array}\!\!.HCl\right)$ and ninety-three (93) parts of anilin. Then filter from ammonium chlorid, which separates out and evaporate off the alcohol. The reaction product remaining can be purified by recrystallization from ligroin and then shows the properties of the body known as "phenyl-anilido-aceto-nitrile,"

Example 7: Dissolve three hundred and eight (308) parts of amino-aceto-nitrile-hydrochlorid in six hundred (600) parts of water and add it to a concentrated aqueous solution of five hundred and thirty (530) parts of anthranilic acid sodium salt. Heat the whole for a few hours at a temperature of about one hundred degrees centigrade, (100°C.) Anthranilic acid at first separates out and then gradually goes into solution. When the anthranilic acid has disappeared, precipitate the product of the reaction, which is omega-cyan-methyl-anthranilic acid, by means of hydrochloric acid and purify it in the known manner.

In all the foregoing examples instead of the aromatic amido bodies mentioned other aromatic amido bodies can be employed.

What I claim is—

1. The process of producing aromatic derivatives of amido compounds of the fatty series by treating an alpha-amino-nitrile as hereinbefore defined with an aromatic amido body.

2. The process of producing aromatic derivatives of amido compounds of the fatty series by treating an alpha-amino-nitrile as hereinbefore defined with a primary aromatic amido body of the benzene series.

3. The process of producing aromatic derivatives of amido compounds of the fatty series by treating amino-aceto-nitrile with anilin.

4. As a new product ethyl-anilido-aceto-nitrile obtainable from amino-aceto-nitrile and mono-ethyl-anilin, which occurs as colorless crystals which can be distilled *in vacuo* at one hundred and eighty-three degrees centigrade (183° C.) and which on treatment with concentrated sulfuric acid can be converted into an amide, melting at about one hundred and fourteen degrees centigrade (114° C.)

In testimony whereof I have hereunto set my hand in the presence of two subscribing witnesses.

GEORG WILHELM MEISER.

Witnesses:
ERNEST F. EHRHARDT,
JACOB ADRIAN.